Patented Nov. 7, 1933

1,934,261

UNITED STATES PATENT OFFICE 1,934,261

SYNTHETIC GUM LACQUER

Charles T. Ellis, Detroit, Mich., assignor to The Sherwin-Williams Company, Cleveland, Ohio, a corporation of Ohio No Drawing. Application August 29, 1931
Serial No. 560,239

1 Claim. (Cl. 134—79)

This invention relates to coating compositions prepared from a synthetic gum such as that described in United States Patent No. 1,799,420 and, more particularly, to certain improvements in the compositions as disclosed in said patent.

Protective coatings formed by compositions made from a synthetic gum, such as that disclosed in Patent No. 1,799,420, have the desirable characteristics of durability, elasticity, hardness and luster and may be applied by brushing, by dipping or by spraying and the films, thus formed, usually set up rapidly and become dry in a short time. In some instances, and especially when the composition contains a large proportion of the synthetic gum, there is a tendency for the dried film to be imprinted by objects coming into contact therewith. It is one of the objects of this invention to overcome this tendency by the addition of a hardening agent which will render the coatings proof against printing without detracting noticeably from their durability, elasticity and luster.

Other objects of the invention and the novel improvements will be apparent from the following description.

I have found that the introduction of a small quantity of a solution of a cellulosic compound into the above mentioned compositions modifies the nature of the protective coating to a remarkable degree. By a cellulosic compound I mean those compounds of cellulose which are soluble in the solvents and mixtures of solvents hereinafter set forth. The best known of these cellulose compounds is cellulose nitrate, which is commonly known as nitrocellulose, and has been extensively used in the lacquer industry for many years. Cellulose acetate, cellulose propionate, cellulose butyrate and other fatty acid esters of cellulose, also benzyl cellulose, are widely known and have been used to a much lesser extent both on account of their greater cost and the necessity for using solvents possessing less desirable properties than the solvents in general use with nitro-cellulose. For these reasons I prefer to use nitro-cellulose, although I do not wish to limit myself to its use, since the other cellulosic compounds, mentioned above, modify the nature of the protective coating in a similar way.

In the lacquer industry many different grades of nitro-cellulose have been used during the last thirty years. Some of these are known as "high viscosity" and some as "low viscosity" grades. In practicing my invention I prefer to use a medium high viscosity grade, or at least nothing substantially below what might be classed in the trade as a 4½ second nitro-cellulose.

Having described my invention in a general way, I will now give a few specific examples of compositions made in accordance therewith. First, I prepare grinding or mixing vehicles according to the following formulas.

| | Parts |
|---|---|
| Synthetic gum such as that of Patent 1,799,420 | 50 |
| Butyl acetate | 15 |
| Butyl alcohol | 5 |
| Amyl acetate | 10 |
| Toluene | 20 |

| | Parts |
|---|---|
| Synthetic gum such as that of Patent 1,799,420 | 10 |
| Rosin—glycerol—ester | 40 |
| Butyl acetate | 15 |
| Butyl alcohol | 5 |
| Amyl acetate | 10 |
| Toluene | 20 |

| | Parts |
|---|---|
| Synthetic gum such as that of Patent 1,799,420 | 10 |
| Fused kauri copal | 40 |
| Butyl acetate | 15 |
| Butyl alcohol | 5 |
| Amyl acetate | 10 |
| Toluene | 20 |

| | Parts |
|---|---|
| Synthetic gum such as that of Patent 1,799,420 | 10 |
| Fused congo copal | 40 |
| Butyl acetate | 15 |
| Butyl alcohol | 5 |
| Amyl acetate | 10 |
| Toluene | 20 |

I next prepare a solution of cellulose nitrate as follows, preferably using a cellulose nitrate of not less than 4½ second viscosity:

| | Parts |
|---|---|
| Cellulose nitrate | 15 |
| Butyl acetate | 15 |
| Amyl acetate | 10 |
| Denatured alcohol | 5 |
| Butyl alcohol | 10 |
| Toluene | 45 |

I now make mixtures of one or more of the above described resin solutions and the solution of the cellulosic compound and by varying the proportions and combinations of solutions protective coatings may be produced which have a wide range in their degree of hardness. It will, of course, be understood that these liquid coatings may be used in the clear or nearly colorless state, without any pigment or filler whatsoever and that they may also be combined with substantially non-opaque colorless pigments when a filling effect is desired. They may also be stained with suitable dye or translucent lake pigment, and when mixed with opaque white, black or colored pigments, a complete line of enamel-like coatings may be obtained.

Coating compositions made as above described may vary within the following limits, although these limits merely indicate a variety of compositions which are now known to produce the desired results.

|  | Parts |
|---|---|
| Pigment | 1–15 |
| Synthetic resin | 30–40 |
| Cellulose-nitrate (above 4½ sec.) | 4–8 |
| Mixed solvents | 65–47 |

In claiming my invention I have used the term "destructively-distilled castor-oil condensation product" and it will be understood that this term is intended to refer to the product described and claimed in the Holton Patent 1,799,420, granted April 7, 1931.

Having thus described my invention, what I claim is:

A base, for a pyroxylin coating composition consisting of 50 parts of "destructively-distilled castor-oil condensation product" mixed with a hardening agent selected from the group consisting of ester gum, fused kauri copal, and fused congo copal, 15 parts butyl acetate, 10 parts amyl acetate, 5 parts butyl alcohol and 20 parts of toluene.

CHARLES T. ELLIS.